No. 727,923. PATENTED MAY 12, 1903.
F. O. FARWELL.
CONTROLLING MECHANISM FOR MOTOR VEHICLES.
APPLICATION FILED DEC. 16, 1902.
NO MODEL. 3 SHEETS—SHEET 2.
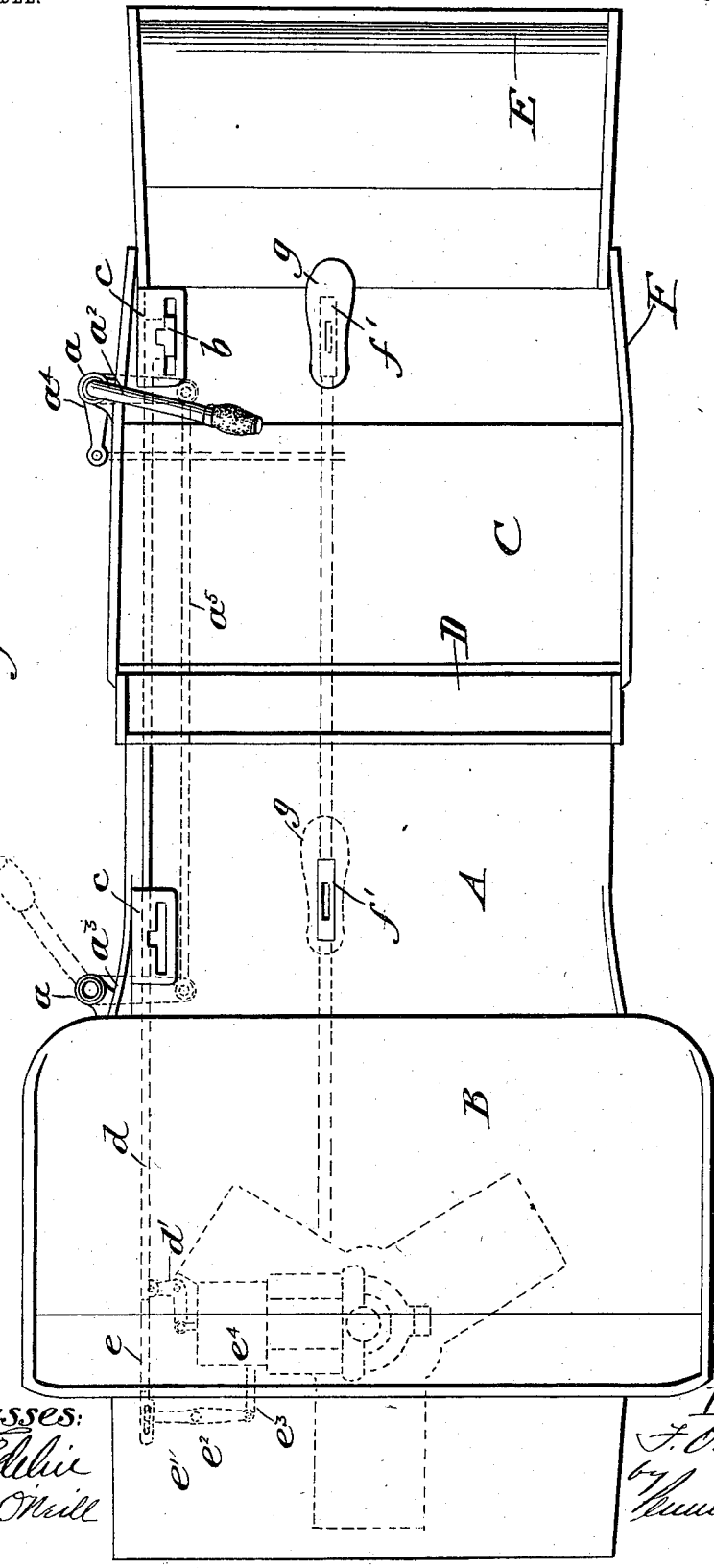

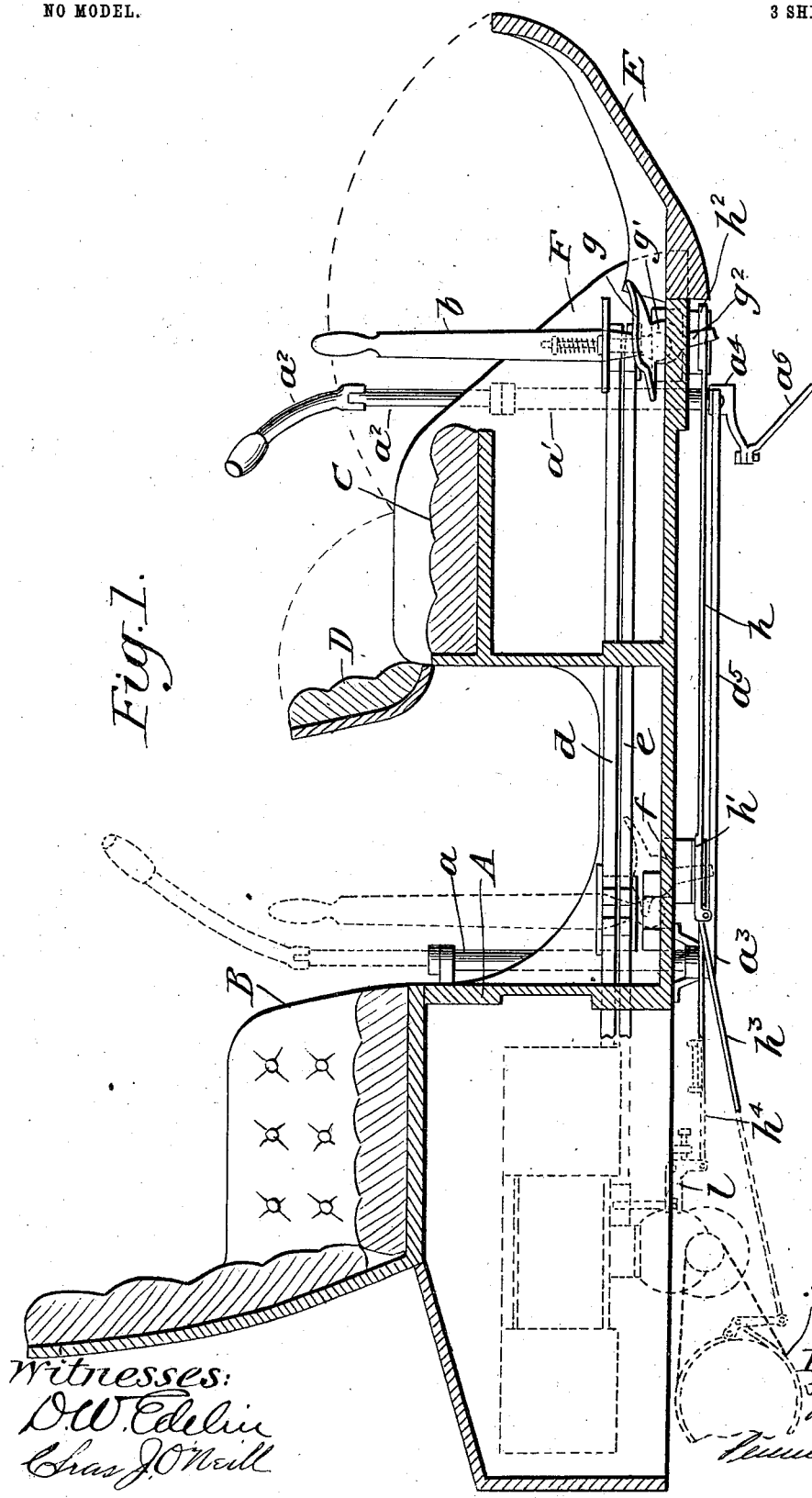

No. 727,923. PATENTED MAY 12, 1903.
F. O. FARWELL.
CONTROLLING MECHANISM FOR MOTOR VEHICLES.
APPLICATION FILED DEC. 16, 1902.
NO MODEL. 3 SHEETS—SHEET 3.
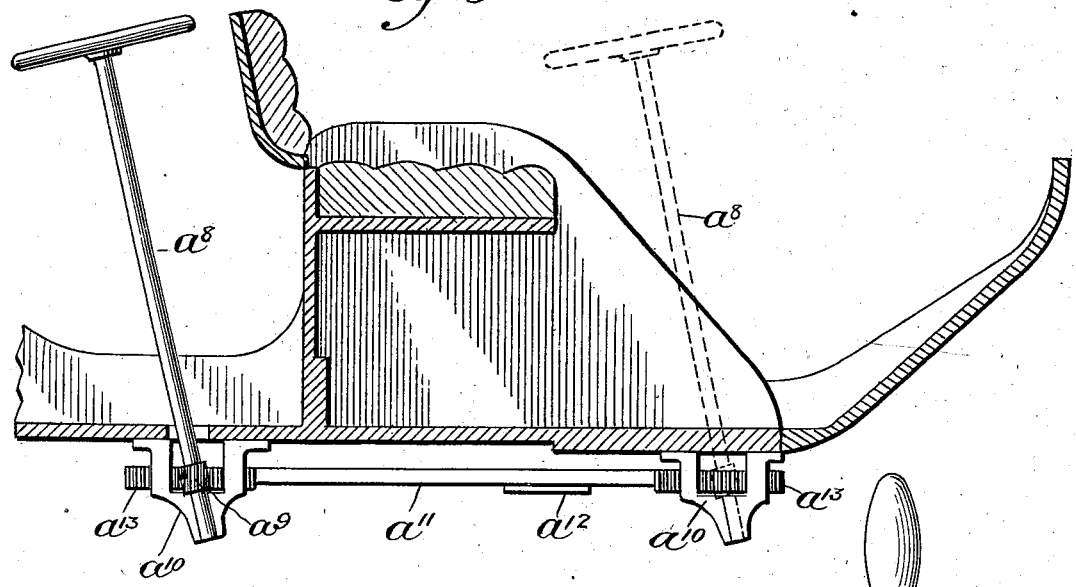
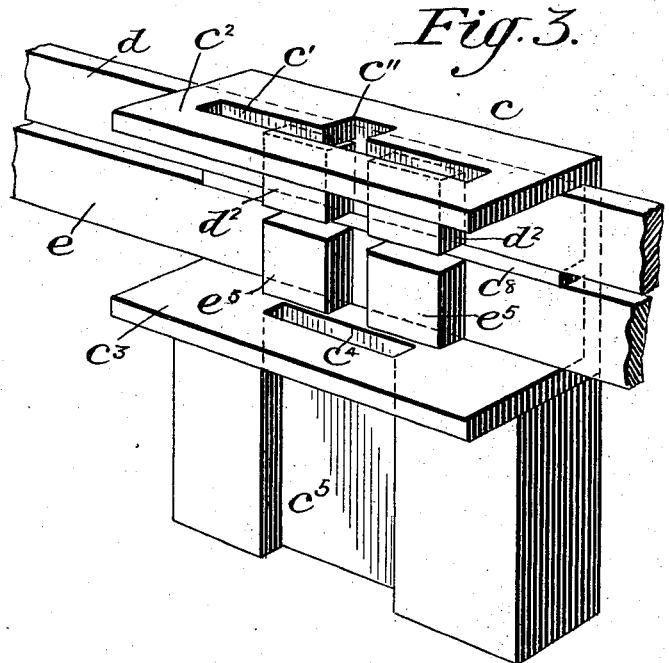
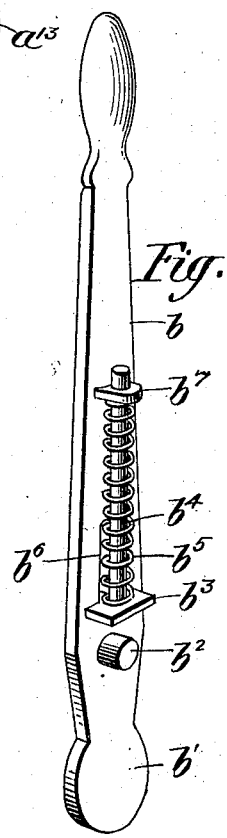
Witnesses:
Inventor.

No. 727,923. Patented May 12, 1903.

UNITED STATES PATENT OFFICE.

FAY O. FARWELL, OF DUBUQUE, IOWA, ASSIGNOR OF ONE-HALF TO THE ADAMS COMPANY, OF DUBUQUE, IOWA.

CONTROLLING MECHANISM FOR MOTOR-VEHICLES.

SPECIFICATION forming part of Letters Patent No. 727,923, dated May 12, 1903.

Application filed December 16, 1902. Serial No. 135,408. (No model.)

*To all whom it may concern:*

Be it known that I, FAY O. FARWELL, a citizen of the United States, residing at Dubuque, county of Dubuque, State of Iowa, have invented certain new and useful Improvements in Controlling Mechanisms for Motor-Vehicles; and I do hereby declare the following to be a full, clear, and exact description of the invention, such as will enable others skilled in the art to which it appertains to make and use the same.

My invention relates to motor-vehicles, and has for its object to provide a self-propelled vehicle having a series of seat-sections with means whereby the controlling devices for operating the vehicle may be removed from operative position in one section to a corresponding position in another section, and to further provide a vehicle of this type having a main seat-section and a forward seat-section, with hinged members on said forward seat-section which are adapted to be folded to constitute a hood or covered compartment conforming to the general contour of the vehicle-body, whereby said vehicle may be employed either with or without the forward seat and may be controlled from either seat by mounting the controlling-levers in the main seat-section or in the forward seat-section.

My invention is illustrated in the accompanying drawings, in which—

Figure 1 is a longitudinal sectional view of a motor-vehicle provided with a main seat and a foldable forward seat-section, with means for mounting the controlling-levers in the section adjacent to the main or the forward seat, as desired. Fig. 2 is a plan view of the same. Fig. 3 is an enlarged perspective view of the socket, couplers, and connecting-rods which are engaged by the lever controlling the speed-changing gears and the reversing-clutches. Fig. 4 is an enlarged detail view of the lever above referred to. Fig. 5 is a modified form of steering-controller.

In the particular embodiment of my invention illustrated the object to be subserved is the conversion of a single-seated motor-vehicle into a two-seated vehicle, with special provisions for shifting the controlling devices from the main seat-section to a position adjacent to the front seat, and vice versa, whereby the chauffeur is enabled to control the vehicle and motor from either seat.

While I have illustrated my invention as applied to a two-seated vehicle, it is to be understood that the said invention is entirely independent of the number of seats or the particular type of motor-vehicle.

Referring to Figs. 1 and 2 of the drawings, A represents the body of a motor-vehicle, in which is mounted a main seat B. That portion of the vehicle-body which is adjacent to the seat B is hereinafter designated as the "main" seat-section, and it will be understood that this term includes that portion of the section of the vehicle which is occupied by or is adjacent to the main seat B. A second seat C, which may be either stationary or removable, is mounted in the forward portion of the vehicle-body, and said portion of the body is herinafter designated as the "forward" seat-section. The forward seat-section is provided with a back D, which is adapted to fold downward, and a hinged footboard or dash E, folding backward and forming, with the back D and the sides F of the vehicle, a hood or compartment in which the seat C is inclosed when the latter is a permanent part of the vehicle.

When the vehicle is used with one seat, the front section is folded to constitute a hood, as above described, which imparts to the structure the general appearance of a typical single-seated motor-vehicle, and the control of the vehicle and motor is necessarily from the main seat B. When it is desired to accommodate more passengers, the front hood is unfolded, as indicated in the drawings, thereby permitting the seat C to be occupied.

Thus far the description applies to vehicles which are generally well known; but in motor-vehicles of this type the controlling is still done from the main seat, which when the forward seat is occupied is, in effect, the rear seat. The necessity of controlling the vehicle at all times from the rear seat is objectionable and dangerous when the vehicle is used for four passengers, because the view of the chauffeur is obstructed by those occupying the forward seat, making it inconvenient for the operator to properly guide the vehicle, and, furthermore, the peculiar conformation of the front seat renders it dangerous for persons unaccustomed to the use of motor-vehicles to occupy the same. It is therefore highly desirable that the operator occupy what is, in effect, the front seat, and in order to accomplish this, it is necessary that the controlling devices—namely, the several levers for actuating the steering, braking, and driving mechanisms—be capable of being changed from one seat-section to another, which will of course enable the vehicle to be controlled from any seat.

In the main seat-section and on the side of the vehicle I mount a socket-piece $a$, adapted to receive a steering-head $a^2$, having a pivoted handle, as is common in this type of apparatus. In the forward section of the vehicle and occupying a corresponding position with respect to the seat C is a second socket $a'$. Attached to the lower part of the socket $a$ is a lever $a^3$, which in turn is connected with the corresponding lever $a^4$ on the socket $a'$ by means of the link or bar $a^5$, with the result that a rotary movement of one socket imparts a like movement to the other. The lever $a^4$ is connected by a link or rod $a^6$ with the usual steering-knuckle, which operates the forward or steering wheels. The steering-head $a^2$ is adapted to be removably secured in either of the sockets $a$ or $a'$, in such relation thereto that when the head is rotated the socket to which it is attached moves with it, thereby moving the steering-wheels to guide the vehicle.

Adjacent to each of the sockets $a$ and $a'$, and preferably on the inside of the vehicle-body, is mounted a casting $c$, which is provided with two horizontal flanges $c^2$ and $c^3$, the former having an elongated slot $c'$ and the latter a relatively short slot $c^4$, which opens into a groove or recess $c^5$ in the body of the casting. Between the two flanges $c^2$ and $c^3$ is the additional shallow flange $c^8$. The several flanges as thus arranged constitute two guidways in which are mounted reciprocating rods $d$ and $e$, which control the driving-clutches and the speed-changing gearing, respectively. The rod or link $d$ is provided with two sets of two lugs $d^2$ $d^2$, which are normally in alinement with the edges of the transverse slot $c''$ in the top flanges of the respective castings $c$. Rod or link $e$ is similarly provided with two sets of two lugs $e^5$ $e^5$, which are normally in alinement with the slot and the lugs above referred to. For the purpose of operating the respective rods or links $d$ and $e$ a hand-lever $b$ is provided, which is adapted to pass through the elongated slot $c'$ in the upper flange of the casting and find a pivotal bearing in the lower part of the casting by the engagement of the rounded lower end $b'$ of the lever and the groove $c^5$ in the casting. A laterally-projecting pin $b^2$ on the lever $b$ passes through the transverse slot or notch $c''$ and normally lies between the lugs $d^2$ $d^2$ on the rod or link $d$, so that as the hand-lever is rocked on its pivot the pin $b^2$, engaging one or the other of the lugs $d^2$ $d^2$, moves the rod or link $d$ backward or forward. The lever $b$ is normally maintained in this position by a spring-detent, which consists of a shoe or plate $b^3$, engaging the upper surface of the flange $c^2$ of the casting $c$, a rod $b^4$, secured to said plate and guided in a lug $b^7$ on the handle, which rod is surrounded by a spiral spring $b^5$, which is compressed between the shoe or plate $b^3$ and the lug $b^7$, and as said shoe or plate $b^3$ is capable of reciprocatory movement in a slot $b^6$ in the handle the said detent is normally held against the flange $c^2$ with sufficient pressure to hold the handle in such relation to the casting that the pin $b^2$ lies between the lugs $d^2$ on the rod $d$. By forcing the handle $b$ vertically downward against the tension of the spring $b^5$ lug $b^2$ is caused to pass between the lugs $e^5$ on rod $e$, with the result that the latter rod may be reciprocated by rocking the lever $b$ backward and forward. It will thus be seen that the lugs $d^2$ and $e^2$, in connection with the casting $c$, constitute coupling means for connecting the clutch-actuating rod $d$ and the speed-gear-operating rod $e$ with the controlling-handle $b$, and as a complete set of these devices are mounted in proper relation to each seat it follows that the controlling-lever $b$ may be mounted in either of said couplers, as desired.

In vehicles of this character it is customary to control the brake mechanism by a treadle or equivalent lever mounted in a suitable bracket in the floor of the vehicle. In the present instance this brake-lever consists of a foot-piece $g$, having a rounded pivot $g'$ on its lower face and terminating in a depending finger $g^2$. The pivot $g'$ finds a bearing in a socket-plate $f$ or $f'$, let into the floor of the vehicle in front of the main seat and the forward seat, respectively. The depending finger $g^2$ of the brake-treadle is adapted to engage a slot in the coupler members $h'$ or $h^2$ of a longitudinal rod or link $h$, which slides in suitable bearings underneath the floor of the vehicle and is connected by a link $h^3$ to a brake $i$, of any preferred form, mounted upon the driven axle. I also prefer to connect to the rod $h$ a second link $h^4$, which in turn is connected to the engine or motor controlling devices—for example, the throttle or similar mechanism for directly controlling the speed of the engine or motor. The treadle $g$, which is readily removable from its engagement in the slot-plate in the bottom of the vehicle, may be mounted in either of said plates $f$ or $f'$, so that the depending finger $g^2$ of said treadle will engage the corresponding coupler $h'$ or $h^2$ on the brake and motor control rod $h$.

When it is desired to convert the vehicle, which is ordinarily intended to be employed as a single-seat vehicle with a closed forward hood, into a double-seated vehicle that may be controlled from the forward seat, the steering-head $a^2$ is removed from the socket $a$, lever $b$ is lifted out of engagement with the rear coupling members, and foot-treadle $g$ is lifted out of the floor-socket $f$, and each of said controlling devices or levers is transferred to the corresponding socket in the forward seat-section after the hood has been unfolded.

The operation of the various controlling devices as thus described is the same whether the controlling-levers be mounted in the main seat-section or in the forward seat-section and is briefly as follows: Upon rocking the treadle $g$ forward the rod $h$ is retracted, thereby releasing the brake $i$ and starting the engine, and a further forward movement of the treadle $g$ will increase the speed of the engine or motor. Conversely, a backward movement of the treadle will first decrease the speed of the engine or motor and subsequently apply the brake, thereby stopping the vehicle. In the steering operation of course the rotation of head $a^2$ will cause a like movement of socket $a'$ and bell-crank $a^4$, with a result that the steering-knuckle is moved to the right or left, and the wheels are given a corresponding inclination to direct the course of the vehicle. In determining the speed and direction of motion—namely, whether the vehicle is to be driven forward or backward, slowly or rapidly—the lever $b$ is operated as follows: When the lever $b$ is in its vertical or normal position, with pin $b^2$ lying between lugs $d^2$ $d^2$ on rod $d$ and in alinement with the slot or notch $c$ in flange $c^2$, the clutch mechanisms, which determine the direction of motion of the vehicle, are both disengaged. Under these conditions the engine or motor may rotate idly—that is, without propelling the vehicle. When the lever $b$ is moved forward, rod $d$ is advanced and, acting through the bell-crank $d'$, throws the clutch for one of the forward speeds into operation. A reverse movement of lever $b$ of course moves the rod $d$ to the rear and through bell-crank $d'$ engages the clutch, which may operate to produce a slow forward or corresponding backing speed, depending upon the position of the bell-crank $d'$. The transmission or speed-changing gears are preferably arranged so that by the movement of rod $e$ in one direction certain gears will come into mesh with each other to give a slow forward speed if one clutch is engaged and a slow backward speed if the other clutch is engaged. If the rod $e$ is moved in the other direction, it will disengage these two gears and engage others, which will cause a medium speed forward if one clutch is engaged and a fast speed forward if the other clutch is engaged. When it is desired to change the position of said rod $e$ and its connecting-lever $e^2$ and links $e^3$, and thereby change the speed ratio, the lever $b$ is returned to its normal position and pressed downward against the tension of the spring-pressed shoe or plate $b^3$ until the pin $b^2$ engages lugs $e^5$ on rod $e$. The forward movement of lever $b$ advances rod $e$ and rocks lever $e^2$, thereby engaging the intermediate forward and the high forward speed-gears, which would probably be the preferred relation of the gears under ordinary circumstances. A slot $e'$ in the end of rod $e$ permits said rod to be returned to its normal position without affecting the relation of the speed-gears. Hence when this relation has been determined lever $b$ is returned to its normal position, whereupon the reaction of the spring shoe or plate lifts the lever in the slot $c'$ until pin $b^2$ engages lugs $d^2$ $d^2$ of the clutch-controlling rod, and the subsequent operation of the lever $b$ will engage the corresponding clutch and drive the vehicle at the intermediate or high speed forward. Should it be desired to set the gearing for a slow speed forward and a slow speed backward, lever $b$ is depressed until pin $b^2$ again engages lugs $e^5$ on rod $e$, and the said lever is rocked backward, with the result that the rod $e$ is moved backward, thereby rocking lever $e^2$ to engage the slow-speed-transmission gears and correspondingly disengage those gears which were previously in operative relation. Lever $b$ is then returned to its normal position to operate rod $d$, and a forward movement of said lever will cause one clutch to engage the slow-forward-speed gear, and backward movement of said lever will disengage this clutch and cause the other clutch to engage the slow moving reversing-gear.

While I have described my interchangeable controlling devices with great exactness, it is to be noted that the invention is not limited to any particular form or type of controlling apparatus, but is intended to cover all such apparatus of whatever character, and it is intended that the claims shall have a correspondingly broad interpretation.

I have illustrated in Fig. 5 a modified form of controlling mechanism for the steering apparatus in which the steering-head above described is replaced by the well-known steering-staff with hand-wheel atttachment, such staff being designated as $a^8$. Said staff finds a bearing in either of two brackets $a^{10}$, secured to the under side of the vehicle in such relation that the staff will occupy a position in front of the main seat or the forward seat, as the case may be. Secured to the lower end of the staff $a^8$ is a worm-gear $a^9$, of the usual type, which engages one or the other of the racks $a^{13}$ on the reciprocating actuating-bar $a^{11}$, which is connected at $a^{12}$ with the usual steering-knuckle coupler. It is to be observed that in this form of my invention the steering-staff may be readily removed from the socket in front of the main seat and placed in operative position with respect to the forward seat, and vice versa.

Having thus described my invention, what I claim is—

1. A motor-vehicle having a plurality of seat-sections, detachable controlling devices for said vehicle and means for mounting the vehicle-controlling devices in operative position in any of said sections adjacent to the corresponding seat.

2. A motor-vehicle having a plurality of seat-sections, detachable controlling devices for said vehicle, and coupling means in the respective seat-sections for receiving the controlling devices, whereby the latter may be mounted adjacent to and the vehicle may be controlled from any one of the seats.

3. A motor-vehicle having a main seat-section and a forward section adapted to contain an additional seat, detachable controlling devices for said vehicle and couplers in the respective seat-sections for receiving the controlling devices whereby the vehicle may be controlled from either of the seats.

4. A motor-vehicle having a main seat-section and a foldable forward section adapted to contain an additional seat, detachable levers for controlling the steering, braking and driving mechanisms, and couplers in the respective sections for receiving the controlling-levers whereby the vehicle may be controlled from either of the seats.

5. A motor-vehicle having a main seat-section and a forward seat-section, steering, braking and driving mechanisms for said vehicle, operating-links for said mechanisms having coupler members in the respective seat-sections, and detachable levers for controlling the respective mechanisms adapted to be mounted in the corresponding couplers in either section.

6. A motor-vehicle having a main seat-section and a forward seat-section, steering, braking and driving mechanisms for said vehicle, operating-links for each of said mechanisms, each link having a coupler member in each seat-section, and detachable levers for controlling the respective mechanisms adapted to be mounted in the corresponding couplers in either section.

7. A motor-vehicle having a main seat-section and a forward seat-section, the latter comprising foldable members adapted to form with the sides a closed compartment, detachable controlling devices for said vehicle, and means for mounting the vehicle-controlling devices in operative position in either of said sections.

In testimony whereof I affix my signature in presence of two witnesses.

FAY O. FARWELL.

Witnesses:
 FRANK B. HIRD,
 FLOYD A. OATEY.